United States Patent
Rishe et al.

(10) Patent No.: US 12,306,002 B2
(45) Date of Patent: May 20, 2025

(54) SYSTEMS AND METHODS FOR NAVIGATING BASED ON SCENIC QUALITY

(71) Applicants: Naphtali David Rishe, Miami, FL (US); Malek Adjouadi, Miami, FL (US)

(72) Inventors: Naphtali David Rishe, Miami, FL (US); Malek Adjouadi, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 281 days.

(21) Appl. No.: 17/840,032

(22) Filed: Jun. 14, 2022

(65) Prior Publication Data
US 2023/0400315 A1   Dec. 14, 2023

(51) Int. Cl.
*G01C 21/00* (2006.01)
*G01C 21/34* (2006.01)

(52) U.S. Cl.
CPC ............................... *G01C 21/3476* (2013.01)

(58) Field of Classification Search
CPC ............ G01C 21/3476; G01C 21/3682; G01C 21/3461
See application file for complete search history.

(56) References Cited

U.S. PATENT DOCUMENTS

| | | | | |
|---|---|---|---|---|
| 2008/0319640 A1* | 12/2008 | Fujita | ................... | G09B 29/106 701/439 |
| 2011/0137551 A1* | 6/2011 | Peri | ..................... | G01C 21/3453 701/533 |
| 2013/0013198 A1* | 1/2013 | Adrain | ............... | G01C 21/3461 701/540 |
| 2016/0125645 A1* | 5/2016 | Khormi | ................... | G06T 17/05 382/103 |
| 2017/0102860 A1* | 4/2017 | Ullrich | ................... | G06Q 10/02 |
| 2021/0172753 A1* | 6/2021 | Johnson, Jr. | ......... | G01C 21/343 |

\* cited by examiner

*Primary Examiner* — Khoi H Tran
*Assistant Examiner* — Tien Minh Le
(74) *Attorney, Agent, or Firm* — SALIWANCHIK, LLOYD & EISENSCHENK

(57) ABSTRACT

Systems and methods for generating routes taking into consideration user preferences for scenery, in addition to or alternatively to time, distance, and/or cost are provided. User preferences for scenery during a trip from one location to another can be quantified and used to augment standard routing methods by giving weight to scenic quality. For example, a weighting triangle can be used, where a user chooses a balanced weighting of three factors, including scenic quality, before a route from the starting location to the destination is generated.

18 Claims, 20 Drawing Sheets

Selection Criteria:

Just Value, Market Value per County Appraiser, total of land and building. What ≥1000000 Or fill in $ ≥
the County Appraiser calls, but is typically less than, The most probable price in [1000000]
cash terms equivalent to cash, or other precisely revealed terms, for which the
appraised property will sell in competitive market under all conditions requisite
to fair sale as of January 1 of the Roll Year AKA Just Value (US$)

Try also: any null non-null ≤$0 ≥$0 ≤$250K ≥$250K
≤$50K <$50K ≥$250K ≤$750K
<$100K ≤$100K ≥$1.0M ≤$1.1M
≥$1.2M ≥$1.5M ≥$1.8M ≤$1.8M ≤$2M
≤$3M ≥$3M ≥$5.0M ≤$5M
and Keywords in any fields: _____ =

SYSTEMS AND METHODS FOR NAVIGATING BASED ON SCENIC QUALITY

GOVERNMENT SUPPORT

This invention was made with government support under CNS2018611 and CNS1920182 awarded by the National Science Foundation. The government has certain rights in the invention.

BACKGROUND

Many methods exist for the optimization of routing from one location to another based on the criteria of travel time, distance, and/or cost of travel. Such routing can be in various modalities, such as by car, on foot, by bicycle, via public transit, or by boat. A typical method of routing involves building a graph comprising street segments, assigning a normalized weighted value to each segment, and then applying the weighted-shortest path algorithm to the graph in order to find the best route.

BRIEF SUMMARY

Embodiments of the subject invention provide novel and advantageous systems and methods for generating routes taking into consideration user preferences for scenery (e.g., visually attractive architecture), in addition to or alternatively to time, distance, and/or cost. User preferences for scenery during a trip from one location to another can be quantified and used to augment standard routing methods by giving weight to scenic quality. The relative importance of urban-scenic interest (or scenic quality) as well as time, cost of travel, and/or distance can be set by the user, for example by utilizing a weight selection triangle, where the user chooses a balanced weighting of three factors, including scenic quality, before the system or method calculates the route from the starting location to the destination.

In an embodiment, a system for generating a route from a starting location to a destination can comprise: a processor; a display in operable communication with the processor; and a (non-transitory) machine-readable medium in operable communication with the processor and having instructions stored thereon that, when executed by the processor, perform the following steps: receiving first data comprising the starting location, the destination, and a relative preference of a user of the system for scenic quality of the route compared to at least one other objective, the at least one other objective comprising time of the route, cost of the route, and distance of the route; utilizing map data to generate segments of potential paths between the starting location and the destination; running an algorithm (e.g., a weighted-shortest path algorithm) on the segments of potential paths, using the relative preference, to generate the route from the starting location to the destination; and displaying, on the display, the route to the user of the system. The relative preference can be set by the user using a weighted selection triangle; for example, the relative preference can comprise a weighted selection triangle of the scenic quality of the route and two other objectives, the two other objectives comprising two of the time of the route, the cost of the route, and the distance of the route. The instructions when executed can further perform the following step: quantifying the scenic quality of the route using values of properties along the segments of potential paths. The quantifying of the scenic quality of the route can comprise using publicly available data on the properties along the segments of potential paths (e.g., values of improvements of the properties along the segments of potential paths (i.e., valuations of buildings), unimproved values of the properties along the segments of potential paths (i.e., valuation of the land of the parcel, ignoring the value of the buildings, if any, thereon), or total values of the properties along the segments of potential paths). The instructions when executed further can perform the following steps: aggregating the values of the properties along the segments of potential paths, on a per-segment basis, to generate a set of aggregated values data; and normalizing the values in the set of aggregated values data, e.g., into a range of from 0 to 1 to generate a normalized set of values data. The normalized set of values data can be used to represent the scenic quality in the relative preference. The instructions when executed can further perform the following steps: receiving second data from the user of the system comprising whether the displayed route is acceptable; and if the second data indicates the displayed route is unacceptable, allowing the user of the system to update the relative preference, running the algorithm again using the updated relative preference to generate an updated route, and displaying the updated route to the user of the system. This process can be repeated until the user indicates the displayed route is acceptable, at which point the displayed route will be the final route (this can occur with respect to the first displayed route). The first data can further comprise at least one choice of the user of the system for types of properties to exclude or include in (the calculation of weights attached to segments of) the (potential) route(s) (e.g., minimum value, type of property (e.g., single-family residential)), and the running of the algorithm to generate the route can further comprise using the at least one choice. The system can comprise a smart device (e.g., a smart phone or smart table), and the smart device can comprise the display, the processor, and/or the machine-readable medium.

In another embodiment, a method for generating a route from a starting location to a destination can comprise: receiving (e.g., by a processor) first data comprising the starting location, the destination, and a relative preference of a user for scenic quality of the route compared to at least one other objective, the at least one other objective comprising time of the route, cost of the route, and distance of the route; utilizing (e.g., by the processor) map data to generate segments of potential paths between the starting location and the destination; running (e.g., by the processor) an algorithm (e.g., a weighted-shortest path algorithm) on the segments of potential paths, using the relative preference, to generate the route from the starting location to the destination; and displaying (e.g., by the processor) (e.g., on a display in operable communication with the processor) the route to the user. The relative preference can comprise a weighted selection triangle of the scenic quality of the route and two other objectives, the two other objectives comprising two of the time of the route, the cost of the route, and the distance of the route. The method can further comprise quantifying (e.g., by the processor) the scenic quality of the route using values of properties along the segments of potential paths. The quantifying of the scenic quality of the route can comprise using publicly available data on the properties along the segments of potential paths (e.g., values of improvements of the properties along the segments of potential paths (i.e., buildings), unimproved values of the properties along the segments of potential paths (i.e., land), or total values of the properties along the segments of potential paths). The method can further comprise: aggregating (e.g., by the processor) the values of the properties along the segments of potential paths, on a per-segment basis, to generate a set of aggregated values data; and normalizing (e.g., by the processor) the values in the set of aggregated values data into a range of from 0 to 1 to generate a normalized set of values data. The normalized set of values data can be used to represent the scenic quality in the relative preference. The method can further comprise: receiving (e.g., by the processor) second data from the user comprising whether the displayed route is acceptable; and if the second data indicates the displayed route is unacceptable, allowing (e.g., by the processor) the user to update the relative preference, running (e.g., by the processor) the algorithm again using the updated relative preference to generate an updated route, and displaying (e.g., by the processor) (e.g., on the display) the updated route to the user. This process can be repeated until the user indicates the displayed route is acceptable, at which point the displayed route will be the final route (this can occur with respect to the first displayed route). The first data can further comprise at least one choice of the user of the system for types of properties to exclude or include in the (evaluation of the scenic value of each segment when computing a potential) route, and the running of the algorithm to generate the route can further comprise using the at least one choice.

BRIEF DESCRIPTION OF DRAWINGS

FIG. 3 shows lesser, but not insignificant weight, on urban scenery interest than the routing of FIG. 2 has.

FIG. 5 shows an image of an example of inclusion/exclusion constraints, in particular property type, allowing the user to include or exclude certain property types in the evaluation of the scenic values of potential routes, according to an embodiment of the subject invention.

FIG. 7 shows an example of two inclusion/exclusion constraint criteria, namely property type and parcel size, allowing the user to include or exclude certain property types and parcel sizes in the evaluation of the scenic values of potential routes, according to an embodiment of the subject invention.

FIG. 12 shows an image of the meta-data of source data of property values, comprising a scenic value weighting criterion.

FIG. 13 shows an image of various types of official valuations of properties, some of which types may be used as source data of property values as a scenic value weighting criterion.

DETAILED DESCRIPTION

Embodiments of the subject invention provide novel and advantageous systems and methods for generating routes (i.e., navigating) taking into consideration user preferences for scenery (e.g., visually attractive architecture), in addition to or alternatively to time, distance, and/or cost. User preferences for scenery during a trip from one location to another can be quantified and used to augment standard routing methods by giving weight to scenic quality. For example, a weighting triangle can be used, where a user chooses a balanced weighting of three factors, including scenic quality, before the system or method calculates the route from the starting location to the destination.

Many users of systems and methods that provide routing calculation and/or assistance desire that the routing include consideration pertaining to the scenic quality (e.g., scenic architectural quality) of the path or route from the starting location to the destination. For example, a user may desire a leisure walk via a route including what might be deemed as visually attractive architecture. Embodiments of the subject invention can quantify such user preferences and scenic quality to augment routing (e.g., standard routing methods) by giving weight to said scenic quality.

Figure 1:
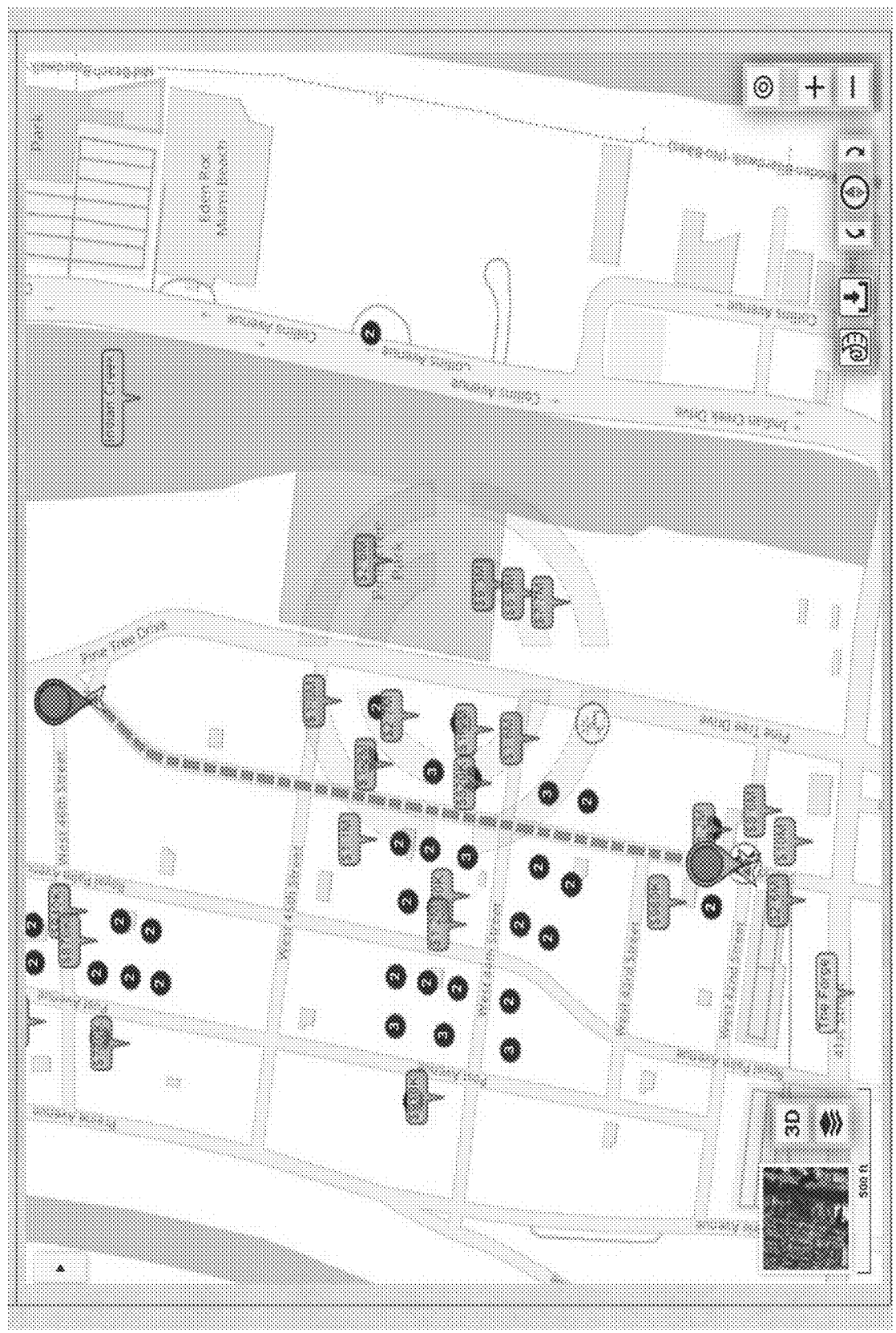
FIG. 1 shows an image of routing that optimizes time and/or distance.
Figure 2:
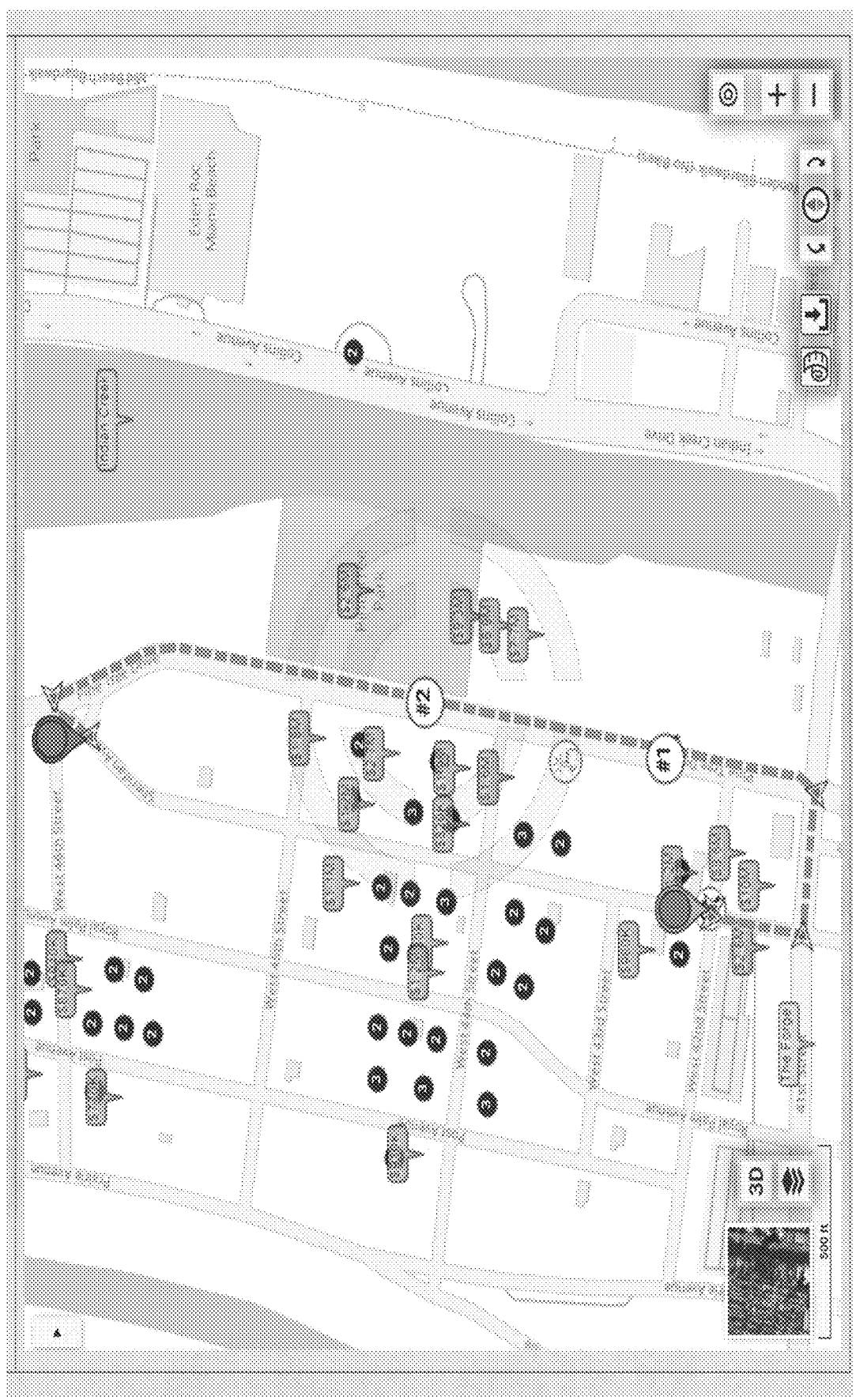
FIG. 2 shows an image of routing that takes into account urban scenery, according to an embodiment of the subject invention.
Figure 3:
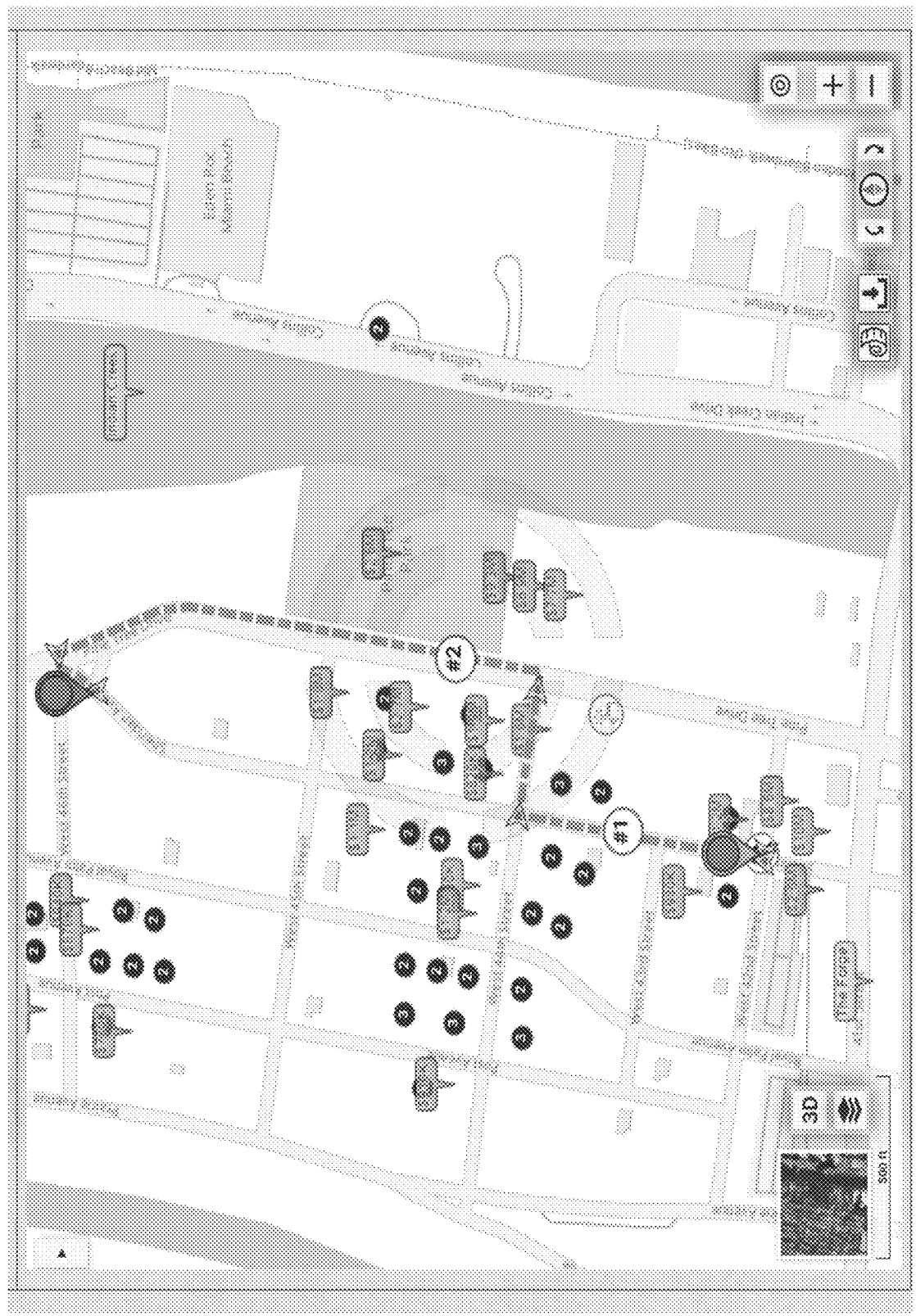
FIG. 3 shows an image of routing that takes into account urban scenery, according to an embodiment of the subject invention.

FIG. 1 shows an image of traditional routing from a starting location to a destination, optimizing the distance and/or time (i.e., the route is the shortest distance from the starting location to the destination). However, the homes along Pine Tree Drive (the road to the right (as depicted in FIG. 1) of the route taken) are much more expensive than those on Sheridan Avenue (the road with the route taken in FIG. 1) and, thus, potentially of heavier significance for scenic quality than those along the shortest route. FIG. 2 shows an image of routing that takes into account urban scenery or scenic quality, according to an embodiment of the subject invention. Referring to FIG. 2, this routing results in a slightly longer journey, with property values taken into account for scenic quality such that much of the journey is along Pine Tree Drive. If lesser, but not insignificant, weight is assigned to the urban-scenic interest (i.e., scenic quality) than in the routing for FIG. 2, then the route would be slightly shorter, yet still longer than that in FIG. 1; this routing is shown in FIG. 3, where a large portion of the journey is still along Pine Tree Drive.

Figure 4A:
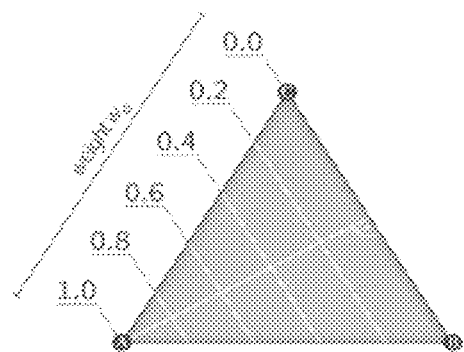
FIG. 4A shows a weighting triangle with values along one side.
Figure 4B:
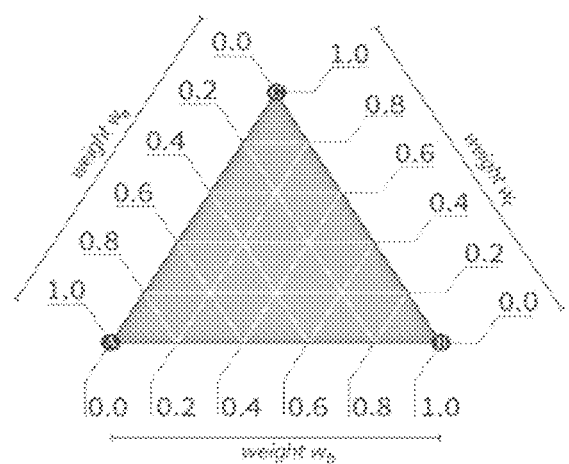
FIG. 4B shows a weighting triangle with weighting values along all three sides.
Figure 4C:
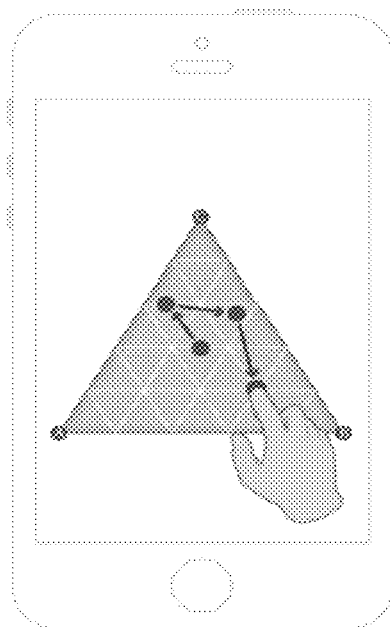
FIG. 4C shows an image of a smart device with the weighting triangle of FIG. 4B displayed thereon, showing a user selecting different weighting points.

In an embodiment, the relative importance of scenic quality (or urban-scenic interest), along with time, cost of travel, and/or distance, can be determined by utilizing a weight selection triangle, as seen in FIGS. 4A-4C (see also U.S. Pat. No. 10,061,501, which is hereby incorporated by reference herein in its entirety). A triangle can allow a user to assign importance weights to three decision optimization objectives. In some embodiments, the weight selection triangle can be displayed on a device (e.g., a smart device such as a smart phone; see also FIG. 4C) that allows a user to make selections of the relative importance of the objectives by touching the touchable triangle using a single gesture. Referring to FIG. 4B, a decision optimization objective a would be the only one considered if the user selected the point labeled "A" at the bottom-left of the triangle (as depicted in FIG. 4B); decision optimization objective b would be the only one considered if the user selected the point labeled "B" at the bottom-right of the triangle (as depicted in FIG. 4B); and decision optimization objective c would be the only one considered if the user selected the point labeled "C" at the top of the triangle (as depicted in FIG. 4B). Points in the body of the triangle correspond to different weights of the relative importance of the three decision optimization objectives (a, b, c), based on the relative distances from the point touched by the user within the triangle to the three corresponding vertices of the triangle. FIG. 4C shows an example where multiple weighting points are selected, which can be for different types of routing for the same starting point and destination or for different routings (i.e., different starting point and/or destination).

FIG. 4A shows the underlying principle of the establishment of a single weight $w_a$ for objective a. FIG. 4B shows the triangle for all three objectives, allowing for the establishment of a tri-variable weight function ($w_a$, $w_b$, $w_c$). The three objectives can be, for example, scenic quality, time, and cost of travel (distance may be substituted for time or cost of travel). By applying a finger gesture (or other commands on a non-touch-screen device such as a desktop computer or laptop computer), the user can move an indicator freely inside the triangle (see FIG. 4C). The position of the indicator establishes a tri-variable weight function, which can then be used as input for a co-optimization algorithm. When the user is satisfied with the established weights (i.e., the final position of the indicator), this can be indicated (e.g., by selecting or pressing a command or button labeled "go" or "okay" or similar).

Figure 5:
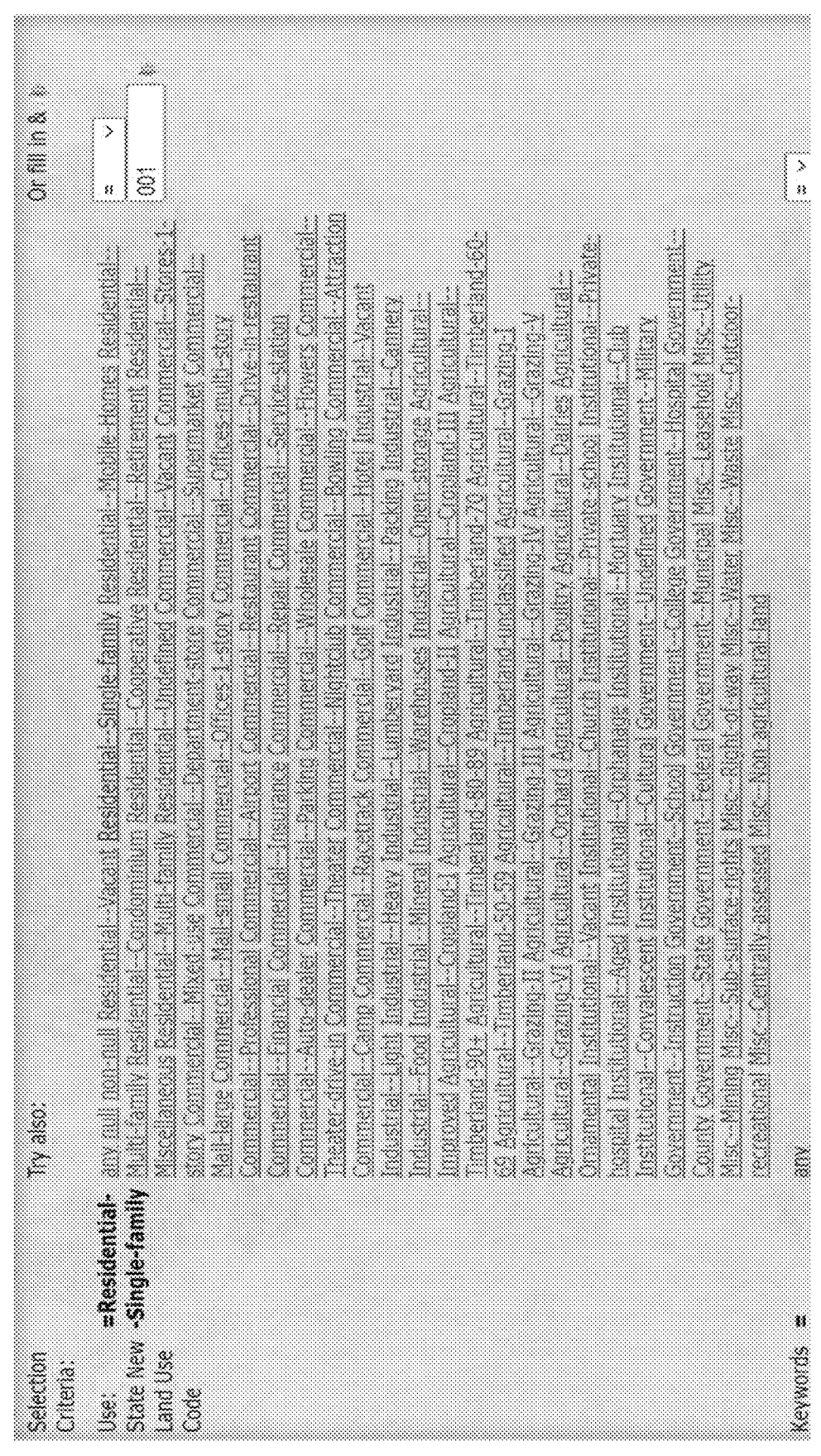
Figure 6:
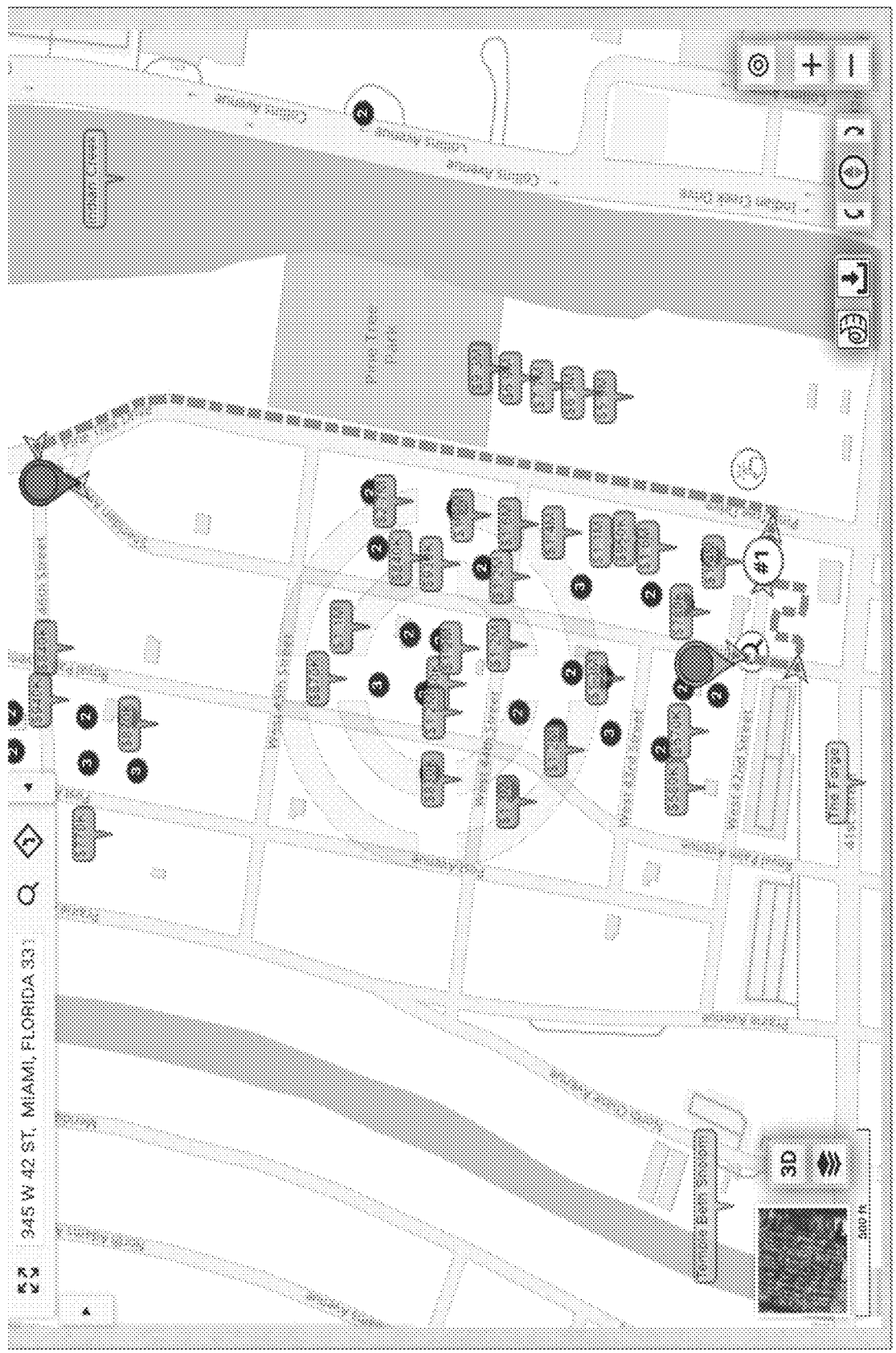
FIG. 6 shows an image of routing that takes into account urban scenery, according to an embodiment of the subject invention, where the criteria of scenic quality include the values of single-family residential homes.

It may be the case that the mere consideration of property values might include properties of the kind that the user does not consider worthy of observing on the journey (i.e., do not add to scenic quality), such as commercial properties or industrial properties. The user may narrow down the values to be considered in the weighting algorithm to be restricted to one or more certain categories of properties from among a group of inclusion/exclusion constraints. FIG. 5 shows an image of a constraint selection, where "Residential—Single-family" has been selected, and FIG. 6 shows an image of the routing that results from this selection, where the route has been optimized considering the scenic interest based on the values of single-family homes along the route, ignoring other property types. This routing removes, or at least minimizes, at least commercial properties and multi-family residences (among others, such as industrial properties) from contributing to the scenic quality routing criterion.

Figure 7:
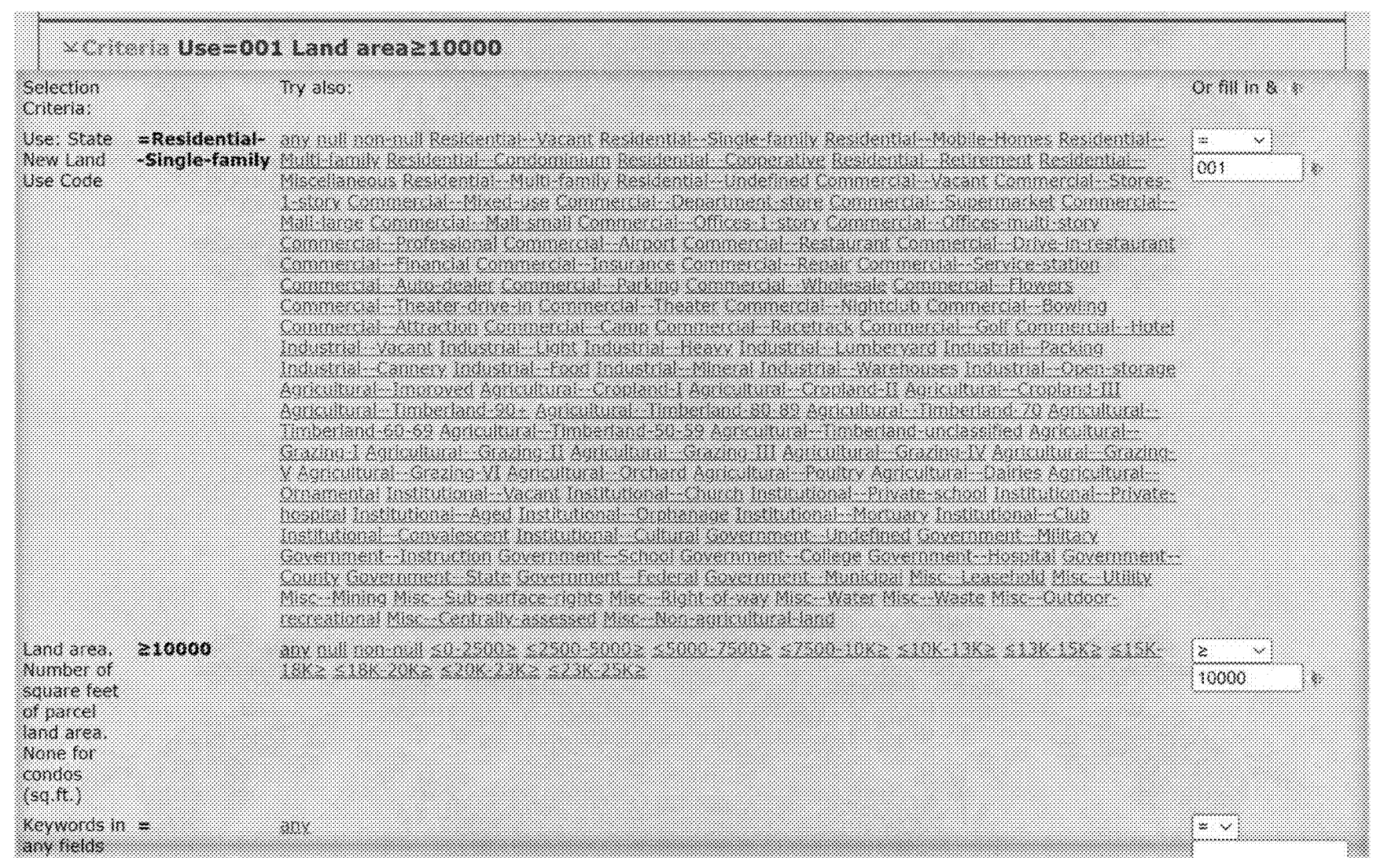
Figure 8:
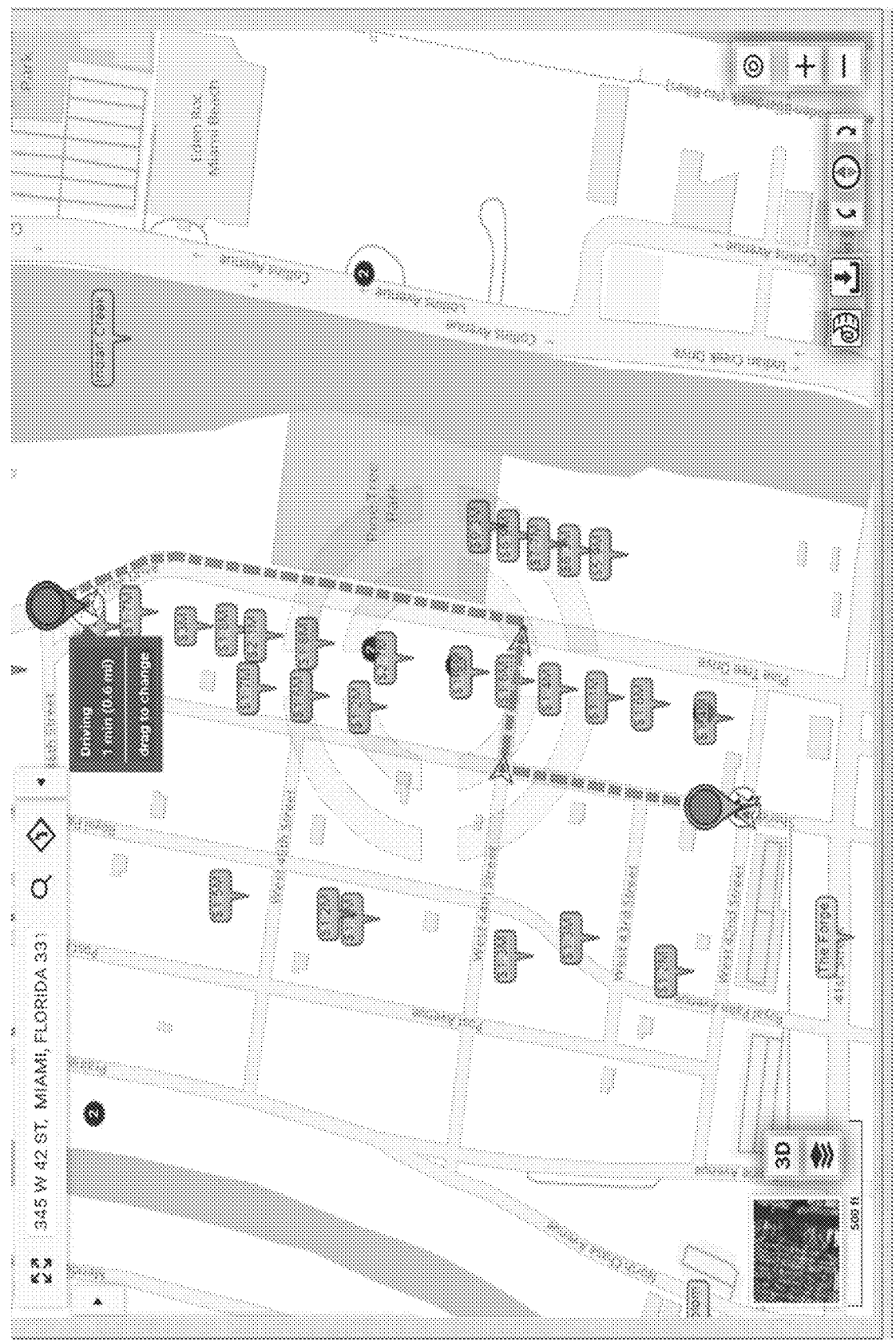
FIG. 8 shows an image of routing that takes into account urban scenery, according to an embodiment of the subject invention, based on the inclusion/exclusion criteria constraints depicted in FIG. 7.

In an embodiment, additional constraints (e.g., potentially arbitrarily complex constraints) can be utilized for the inclusion or exclusion of types of properties in evaluating the scenic quality or urban-scenic interest. FIG. 7 shows an image with an example of such an additional constraint. For example, a user may cause the system to evaluate the scenic interest only of single-family homes with a lot size of at least 10,000 square feet. FIG. 8 shows an image of routing that takes into account the constraints depicted in FIG. 7.

Figure 9:
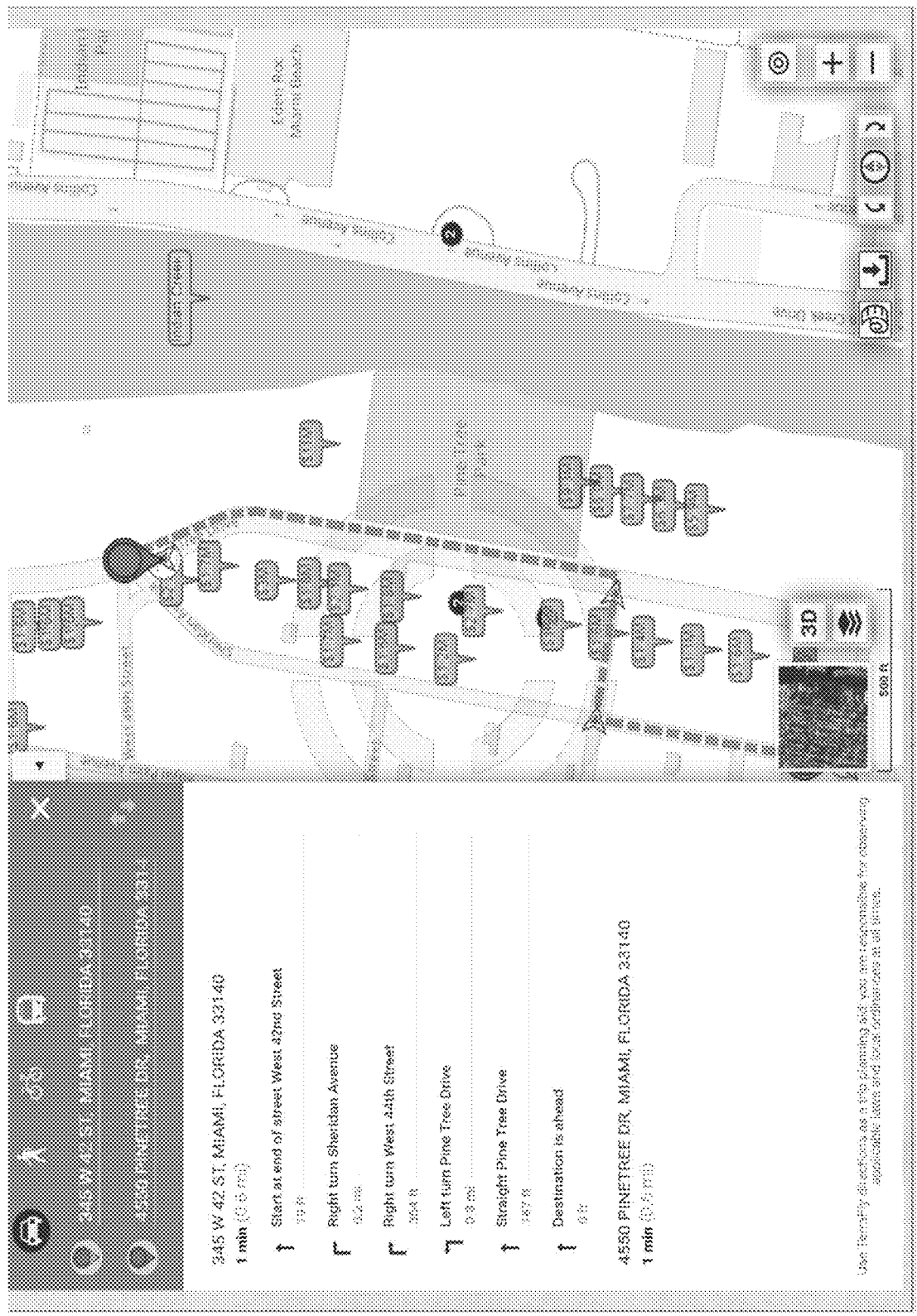
FIG. 9 shows an image of the routing from FIG. 8, showing routing steps as well.
Figure 20:
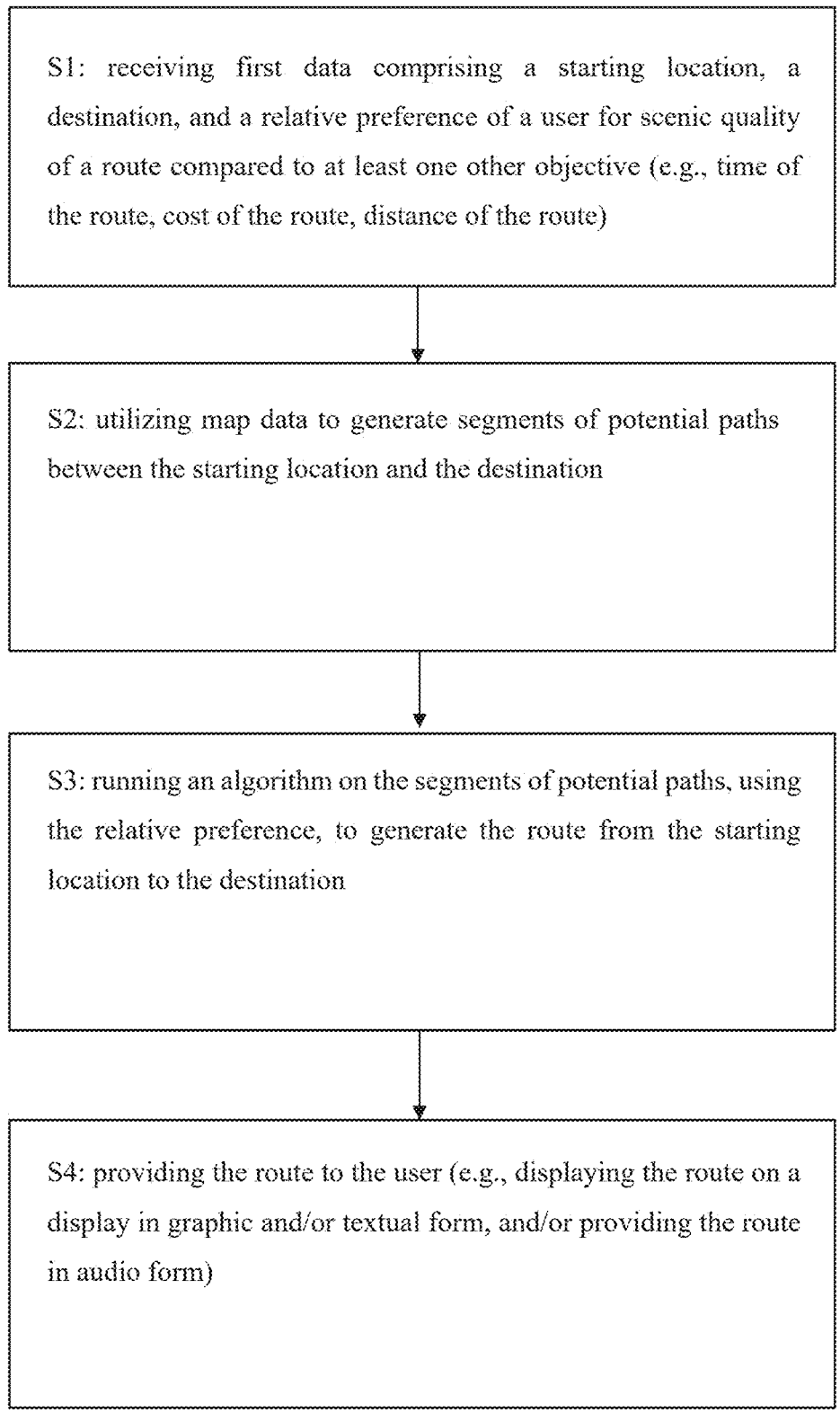
FIG. 20 shows a flowchart of a method for generating a route from a starting location to a destination, according to an embodiment of the subject invention.

The steps of the routing can be presented to the user via oral instructions, in graphic form (e.g., next to, over, or in lieu of the actual path taken for the journey based on the routing), or in textual form (e.g., next to, over, or in lieu of the actual path taken for the journey based on the routing). FIG. 9 shows an image of the routing from FIG. 8, with the routing steps presented in textual form, presented partly over the path taken for the proposed journey based on the routing. Referring to FIG. 20, in an embodiment, a method for generating a route from a starting location to a destination can comprise: S1—receiving (e.g., by a processor) first data comprising the starting location, the destination, and a relative preference of a user for scenic quality of the route compared to at least one other objective (e.g., time of the route, cost of the route, and/or distance of the route); S2—utilizing (e.g., by the processor) map data to generate segments of potential paths between the starting location and the destination; S3—running (e.g., by the processor) an algorithm on the segments of potential paths, using the relative preference, to generate the route from the starting location to the destination; and S4—providing (e.g., by the processor) the route to the user (e.g., displaying the route on a display in graphic and/or textual form, and/or providing the route in audio form).

Figure 10:
FIG. 10 shows an image of routing that takes into account urban scenery, according to an embodiment of the subject invention, where the value per square foot of the properties along the route is displayed, and the scenic quality criteria include the property value per building square foot rather than, or in addition to, the building value.

When determining scenic quality, the weighting desired by the user might be based on, for example, the total dollar value of the properties (or could be another related metric that can better capture the user's preferences, such as value per square foot of the properties). FIG. 10 shows an image of routing that takes into account scenic quality and in particular value per square foot of the properties. Referring to FIG. 10, the value per square foot of properties along the route (and in other locations near the route as well) is displayed, and the scenic quality criteria include the property value per building square foot rather than, or in addition to, the building value.

Figure 11:
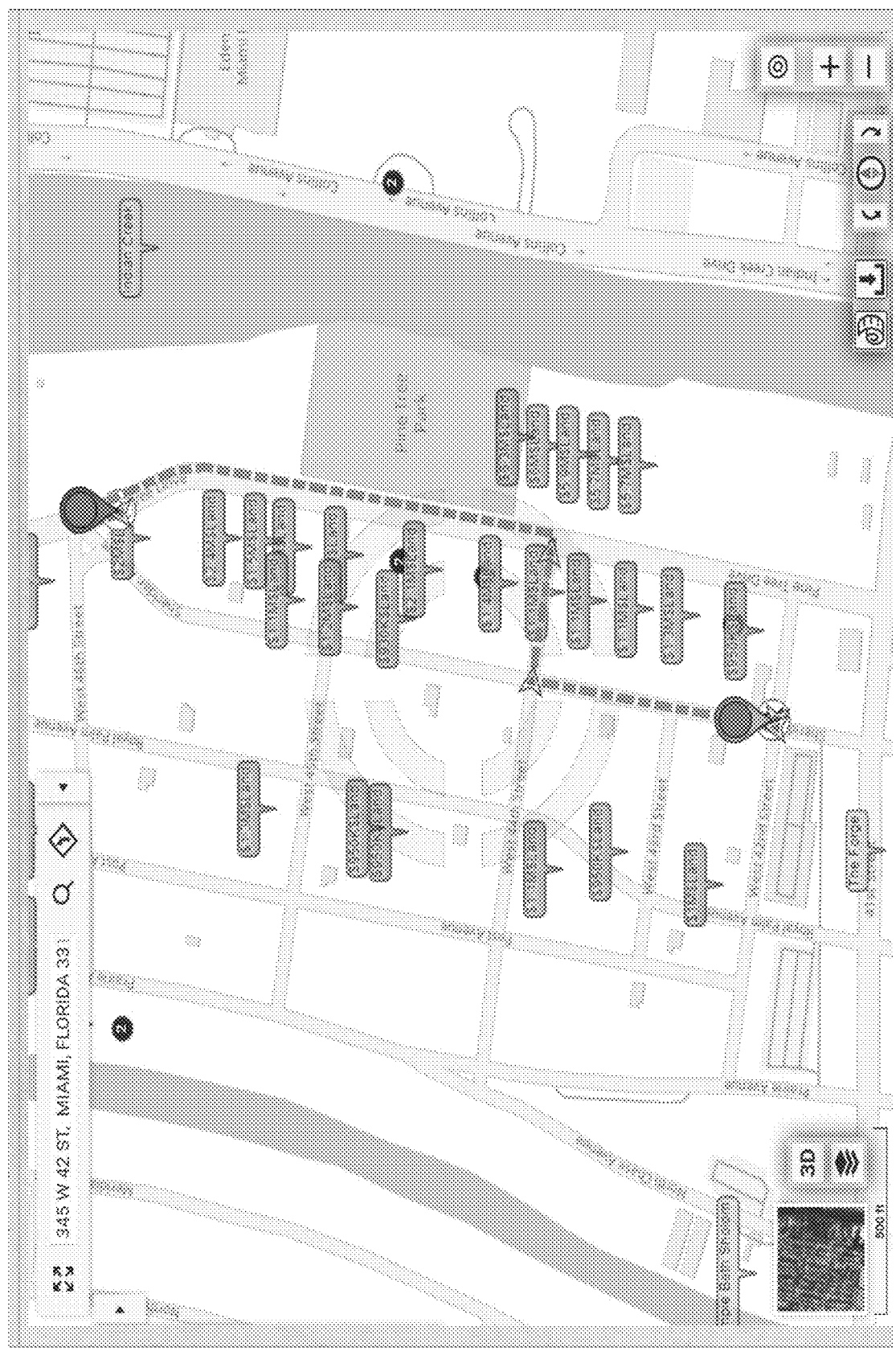
FIG. 11 shows an image of routing that takes into account urban scenery, according to an embodiment of the subject invention, where values of unimproved land on properties along the route are displayed.

Rather than the entire property value, the user preference for weighting value may instead just be for the value of the structure (in real estate, this can be referred to as "improvements") or the value of the land without the structure (in real estate, this can be referred to as the "unimproved land" value). FIG. 11 shows an image of routing that takes into account scenic quality and, in particular, the unimproved land value of the properties. Referring to FIG. 11, the unimproved land values of the properties along the route (and in other locations near the route as well) are displayed.

In embodiments of the subject invention, the source of valuation of each property along a potential route from a starting location to a destination can be, for example, the assessed value of the property per county records, recent sale price, or current asking price from MLS records. In the case of a county assessed value, a user would typically choose for the purpose of the weighting, an objective value rather than tax valuation because the latter may be dependent on the property owner's status rather than only on the objective property quality. For example, in Florida, counties publish multiple "values" for the same home, including "the taxable value" (i.e., the value against which the property tax is assessed and which takes into account the freezing of homestead property valuation and various discounts to which the current property owner may be entitled). A more objective county-published value in Florida is what the counties call the "just value." While it may or may not be a true reflection of the current value of the property, it is objective in the sense that the county applies the same methodology to estimate the "just values" of various properties; thus, it can be useful for the weighting utilized in embodiments of the subject invention. FIG. 12 shows the selection of the "just value" data type and source for how the property values are determined for weighting.

Figure 13:
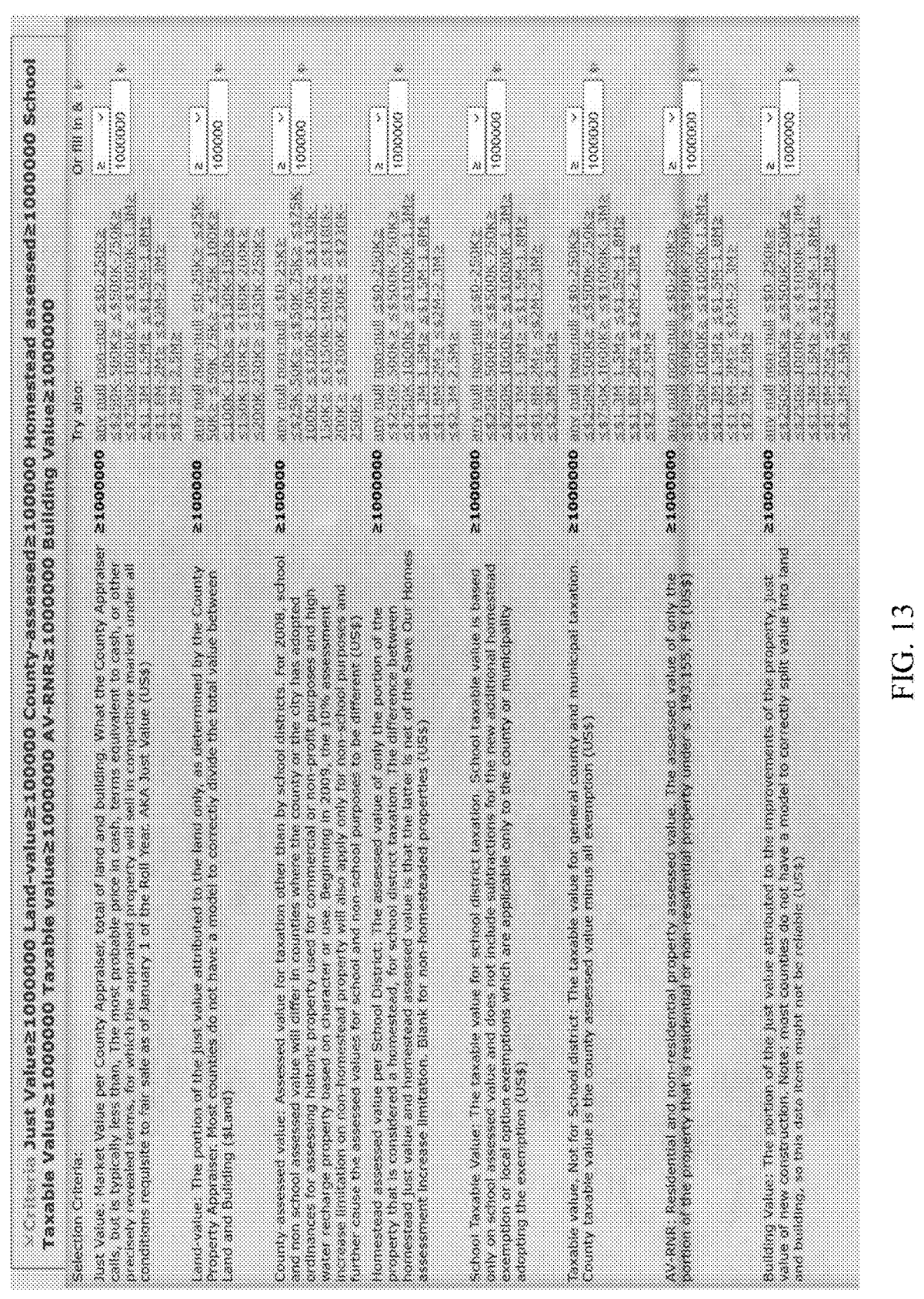
Figure 14:
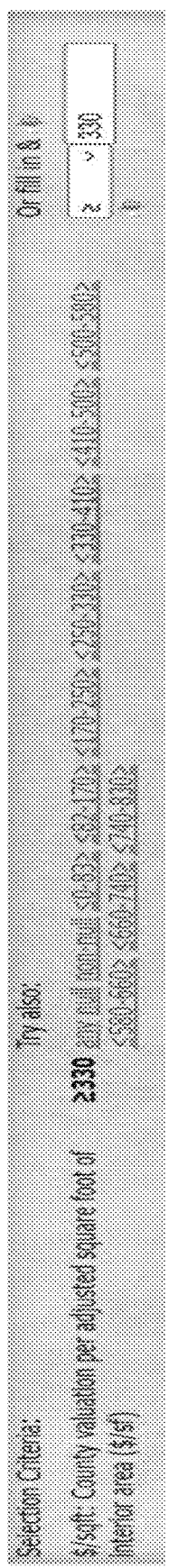
FIG. 14 shows the metadata of an alternative data type that can be used as a scenic value weighting criterion, namely the value per square foot (i.e., the ratio of the official property valuation to the official size of the home on the property).

FIG. 13 shows an image of several choices of various official valuation types available from Florida counties. Among these valuations, the most meaningful for urban-scenic (or scenic quality) routing purposes may be the "just value," while the land-value and building-value can also be meaningful. The other valuation types in FIG. 13 are affected by the demographics of the property owner and, thus, are not meaningful for urban-scenic routing purposes. Other objective metrics can be computed utilizing publicly available data about properties. For example, the value per square foot can be computed from the published official assessed home value and the published official home size, as depicted in FIG. 14.

Figure 15:
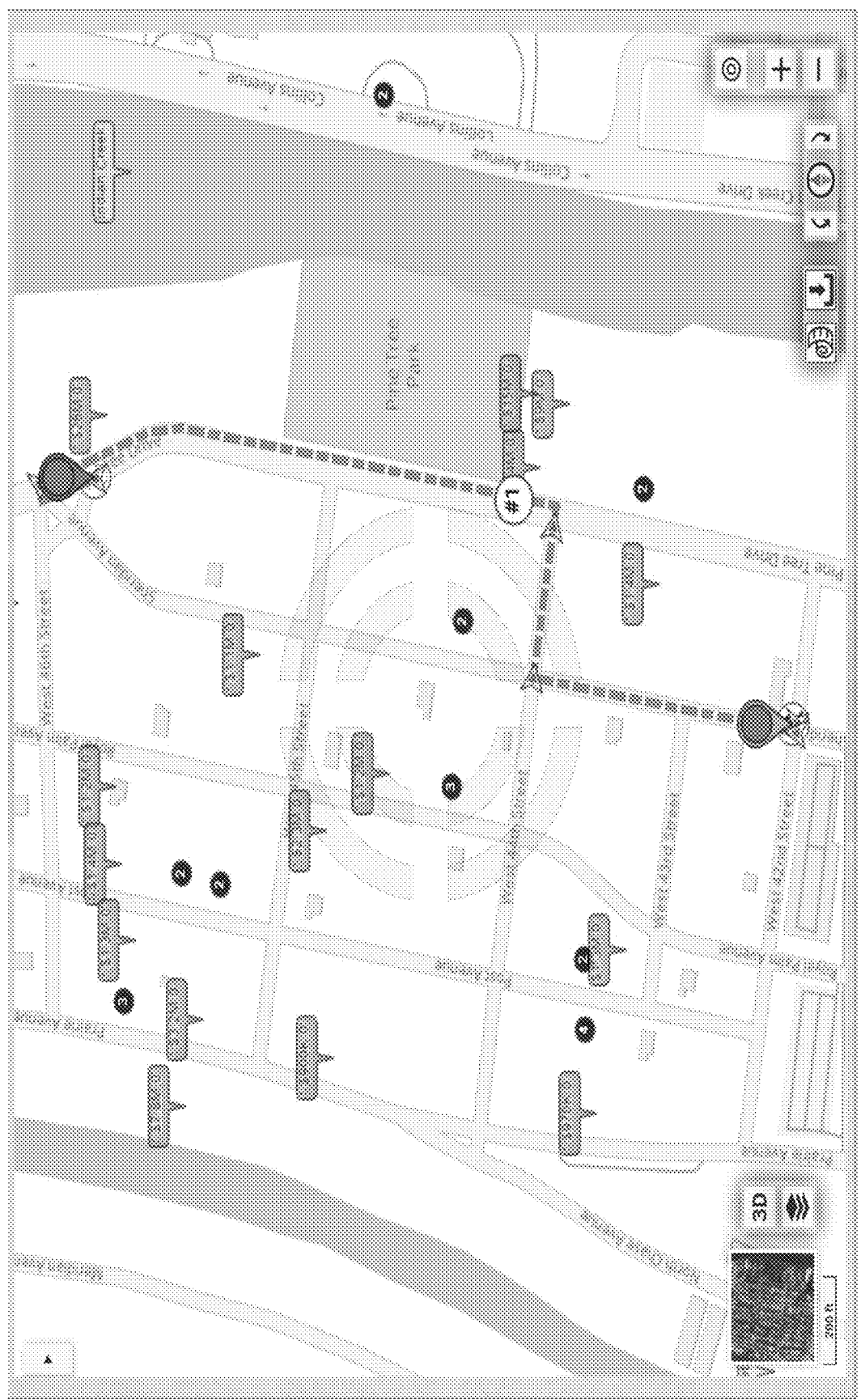
FIG. 15 shows an image of routing that takes into account urban scenery, according to an embodiment of the subject invention, where values of properties listed in the real estate multiple listing service (MLS) are displayed and comprise the source data of property values as a scenic value weighting criterion.

FIG. 15 shows an image of routing that takes into account scenic quality derived from property values based on the current asking price in the real estate multiple listing service (MLS).

Figure 16:
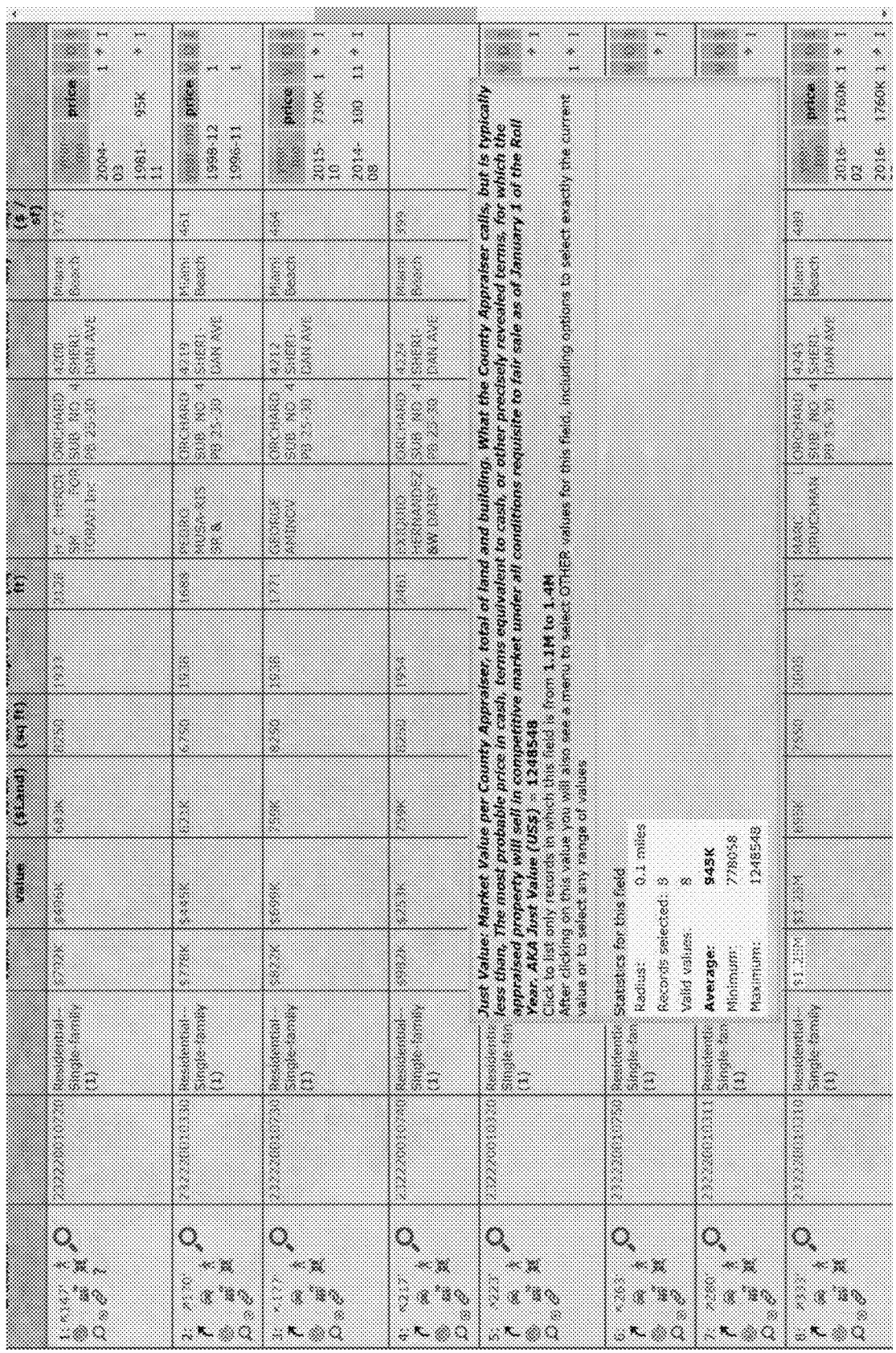
FIG. 16 shows a printout of the source data allowing the system to compute the maximum and/or average property value along each segment (e.g., along the 4200 segment of Sheridan Avenue in Miami, Florida, United States).

When the source property value is per-house, it can be translated into value weight per street segment using any appropriate statistical aggregation of data known in the art. FIG. 16 shows a printout of the source data allowing the system to compute a maximum and/or average property value along each segment (e.g., along the 4200 segment of Sheridan Avenue in Miami, Florida, United States). Other reasonable statistical aggregation functions can be used for the purpose of establishing the valuation of properties for the purpose of urban-scenic routing (i.e., routing while taking into consideration scenic quality). Such other reasonable statistical aggregation functions can include, for example, the median value, the average value after exclusion of low outliers (e.g., exclusion of the lowest 1%, 5%, or 10% of values), the median of the highest 20% of values, the number of homes valued at over a predetermined amount (e.g., $1 million), and/or the number of homes valued in a predetermined range (e.g., $1 million to $2 million) plus a multiplier (e.g., double) of the number of homes valued at over a predetermined amount (e.g., over the upper end of the predetermined range, such as over $2 million).

Sourcing property valuation per individual property (e.g., per house) and then their aggregation per street segment can be done using various statistical methods, as discussed above. In another embodiment, an already pre-aggregated compilation of property values can be used if available (e.g., in the United States from the American Community Survey (ACS) or the United States Census (Census)). However, said data sources may have a sparser spatial granularity than a street segment, in which case the urban-scenic routing method would be slightly less precise. For example, the 4200 block of Sheridan Avenue and the 4200 block of Pine Tree Drive in Miami, Florida are within the same home valuation statistical area in ACS, and they are in the same block group in Census. Further, one street segment may lie on the boundary of two statistical areas, in which case the urban-scenic valuation of the street segment may combine the even side of the street segment and the odd side of the street segment.

Figure 17:
FIG. 17 shows a display of a proposed routing that takes into account urban scenery, according to an embodiment of the subject invention, where overhead satellite imagery is included in the display in order to better inform the user.
Figure 18:
FIG. 18 shows a display of a proposed routing that takes into account urban scenery, according to an embodiment of the subject invention, where images of facades of houses along the route are displayed in order to better inform the user.
Figure 19:
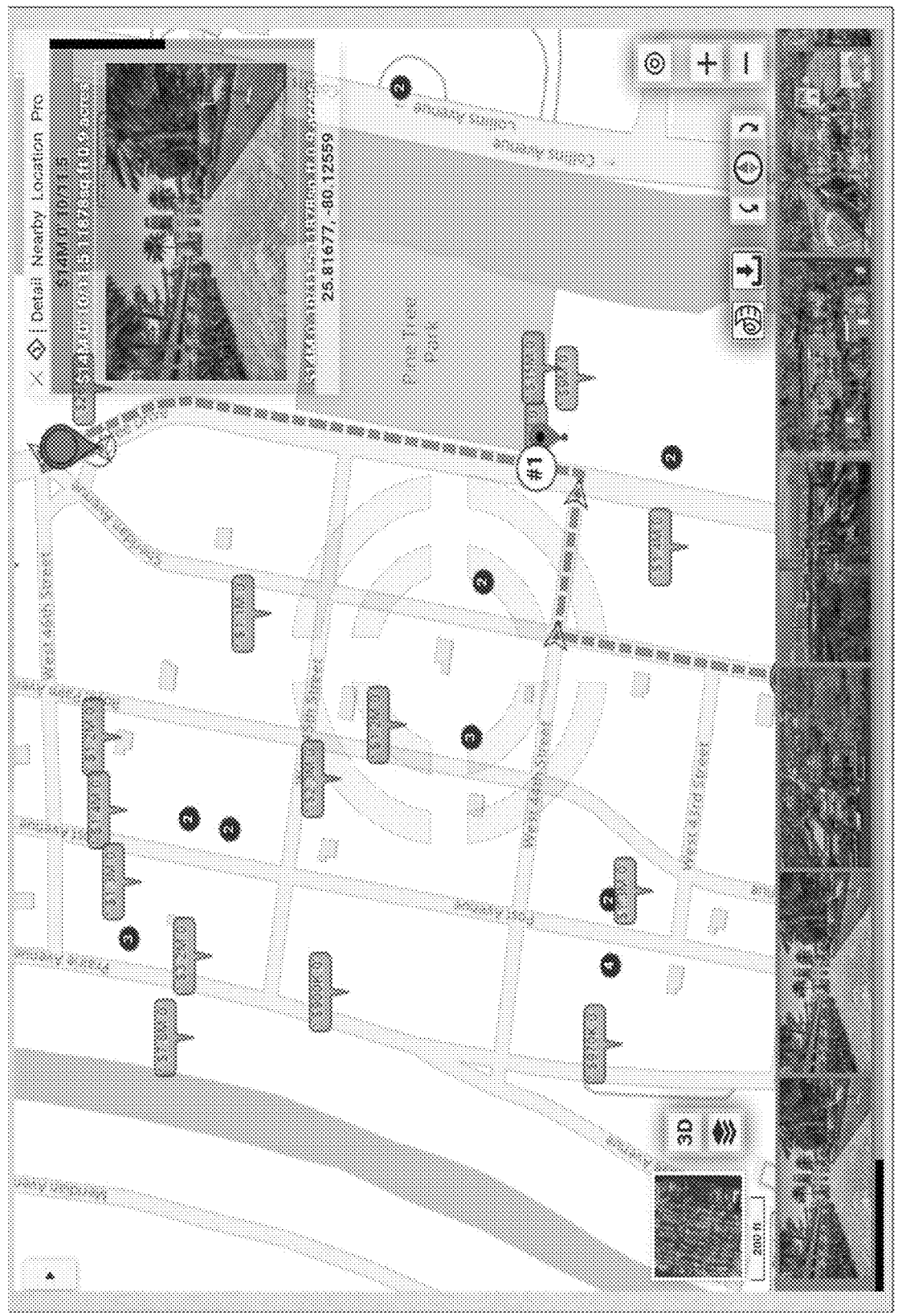
FIG. 19 shows a display of a proposed routing that takes into account urban scenery, according to an embodiment of the subject invention, where oblique or bird's eye images of houses along the proposed route are displayed in order to better inform the user.

In many embodiments, after property values have been aggregated (e.g., per street segment), for example, using any of the aforementioned per-house or sparser data sources, the aggregated values can be normalized over the entire relevant map portion (containing all likely segments for routes between the starting location and the destination). For example, the aggregated values can be normalized into a range of 0 to 1. Thereafter, the total normalized value of each street segment can be computed by considering said normalized values in conjunction with other criteria (e.g., the street segment's expected travel time). Relative weights can be assigned to the various criteria, using a method for assigning weights to different objectives (e.g., the aforementioned weight selection triangle (see FIGS. 4A-4C)). Once a route is computed, it can be presented to a user for approval (e.g., by being displayed on a display in operable communication with a processor executing steps for the routing). If the routing is presented to the user in a graphic form, it may be further enhanced in various visual forms to inform the user and let the user visually confirm that the choice of the route shows what the user intended or have the user adjust the relative weights and/or criteria. For example, overhead imagery of the properties that the user would pass by or encounter (on the currently-offered route) can be displayed, as shown in FIG. 17. Another example is to display photographs of facades of the properties (i.e., facades of houses) that the user would pass by or encounter (on the currently-offered route), as shown in FIG. 18. Another example is to display photographs of oblique (or bird's eye) views of the properties (e.g., of houses on the properties) that the user would pass by or encounter (on the currently-offered route), as shown in FIG. 19. After viewing the currently-offered route, possibly in conjunction with additional graphical items (such as the overhead images, façade images, and/or oblique angle images), the user can then confirm the route or adjust the relative weights and/or criteria.

Embodiments of the subject invention provide a focused technical solution to the focused technical problem of how to address user preferences for navigating while taking scenic quality into consideration. Embodiments of the subject invention improve the device on which the processor is located by minimizing the resources dedicated to searching (e.g., for scenery along potential paths between a starting location and a destination) and changing a calculated route in view of results of such searching. This is accomplished by providing a route generated with scenic quality already accounted for.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the Willi "comprising" contemplates other embodiments that "consist" or "consisting essentially of" the recited component(s).

When ranges are used herein, such as for weight ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 foot" means from 0.95 foot to 1.05 foot.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for generating a route from a starting location to a destination, the system comprising:
   a processor;
   a display in operable communication with the processor; and
   a machine-readable medium in operable communication with the processor and having instructions stored thereon that, when executed by the processor, perform the following steps:
     receiving first data comprising the starting location, the destination, and a relative preference of a user of the system for scenic quality of the route compared to at least one other objective, the at least one other objective comprising time of the route, cost of the route, and distance of the route;
     quantifying the scenic quality of the route using just values of properties along the segments of potential paths;
     aggregating the just values of the properties along the segments of potential paths, on a per-segment basis, to generate a set of aggregated just values data;
     normalizing the just values in the set of aggregated just values data into a fixed range to generate a normalized set of just values data,
     utilizing map data to generate segments of potential paths between the starting location and the destination;
     running an algorithm on the segments of potential paths, using the relative preference, to generate the route from the starting location to the destination;
     providing the route in audio form to the user of the system; and
     displaying, on the display, the route in both graphic and textual form to the user of the system,
   the relative preference comprising a weighted selection triangle of the scenic quality of the route and two other objectives, the two other objectives comprising two of the time of the route, the cost of the route, and the distance of the route,
   the normalized set of just values data being used to represent the scenic quality in the relative preference,
   the just values being objective market values published by a county appraiser that governs a county having the properties located therein, and
   the just value of each property being a combined value of land and building on said property, the combined value being a price for which said property is appraised by the county appraiser as being able to be sold for in a competitive market as of January 1 of the year for which the just value was appraised by the county appraiser.

2. The system according to claim 1, the instructions when executed further performing the following step:
   quantifying the scenic quality of the route using values of properties along the segments of potential paths.

3. The system according to claim 2, the quantifying of the scenic quality of the route comprising using publicly available data on the properties along the segments of potential paths.

4. The system according to claim 2, the quantifying of the scenic quality of the route comprising using values of improvements of the properties along the segments of potential paths.

5. The system according to claim 2, the quantifying of the scenic quality of the route comprising using unimproved values of the properties along the segments of potential paths.

6. The system according to claim 2, the instructions when executed further performing the following steps:
aggregating the values of the properties along the segments of potential paths, on a per-segment basis, to generate a set of aggregated values data; and
normalizing the values in the set of aggregated values data into a fixed range to generate a normalized set of values data,
the normalized set of values data being used to represent the scenic quality in the relative preference.

7. The system according to claim 1, the instructions when executed further performing the following steps:
receiving second data from the user of the system comprising whether the displayed route is acceptable; and
if the second data indicates the displayed route is unacceptable, allowing the user of the system to update the relative preference, running the algorithm again using the updated relative preference to generate an updated route, and displaying the updated route to the user of the system.

8. The system according to claim 1, the first data further comprising at least one choice of the user of the system for types of properties to exclude from or include in an evaluation of the scenic quality of the route, and
the running of the algorithm to generate the route further comprising using the at least one choice.

9. The system according to claim 1, further comprising a smart device, the smart device comprising the display and the processor.

10. A method for generating a route from a starting location to a destination, the method comprising:
receiving, by a processor, first data comprising the starting location, the destination, and a relative preference of a user for scenic quality of the route compared to at least one other objective, the at least one other objective comprising time of the route, cost of the route, and distance of the route;
quantifying the scenic quality of the route using just values of properties along the segments of potential paths;
aggregating the just values of the properties along the segments of potential paths, on a per-segment basis, to generate a set of aggregated just values data;
normalizing the just values in the set of aggregated just values data into a fixed range to generate a normalized set of just values data;
utilizing, by the processor, map data to generate segments of potential paths between the starting location and the destination;
running, by the processor, an algorithm on the segments of potential paths, using the relative preference, to generate the route from the starting location to the destination;
providing the route in audio form to the user; and
displaying, on a display in operable communication with the processor, the route in both graphic and textual form to the user,
the relative preference comprising a weighted selection triangle of the scenic quality of the route and two other objectives, the two other objectives comprising two of the time of the route, the cost of the route, and the distance of the route,
the normalized set of just values data being used to represent the scenic quality in the relative preference,
the just values being objective market values published by a county appraiser that governs a county having the properties located therein, and
the just value of each property being a combined value of land and building on said property, the combined value being a price for which said property is appraised by the county appraiser as being able to be sold for in a competitive market as of January 1 of the year for which the just value was appraised by the county appraiser.

11. The method according to claim 10, further comprising:
quantifying the scenic quality of the route using values of properties along the segments of potential paths.

12. The method according to claim 11, the quantifying of the scenic quality of the route comprising using publicly available data on the properties along the segments of potential paths.

13. The method according to claim 11, the quantifying of the scenic quality of the route comprising using values of improvements of the properties along the segments of potential paths.

14. The method according to claim 11, the quantifying of the scenic quality of the route comprising using unimproved values of the properties along the segments of potential paths.

15. The method according to claim 11, further comprising:
aggregating the values of the properties along the segments of potential paths, on a per-segment basis, to generate a set of aggregated values data; and
normalizing the values in the set of aggregated values data into a fixed range to generate a normalized set of values data,
the normalized set of values data being used to represent the scenic quality in the relative preference.

16. The method according to claim 10, further comprising:
receiving second data from the user comprising whether the displayed route is acceptable; and
if the second data indicates the displayed route is unacceptable, allowing the user to update the relative preference, running the algorithm again using the updated relative preference to generate an updated route, and displaying the updated route to the user.

17. The method according to claim 10, the first data further comprising at least one choice of the user for types of properties to exclude from or include in an evaluation of the scenic quality of the route, and
the running of the algorithm to generate the route further comprising using the at least one choice.

18. A system for generating a route from a starting location to a destination, the system comprising:
a processor;
a display in operable communication with the processor; and
a machine-readable medium in operable communication with the processor and having instructions stored thereon that, when executed by the processor, perform the following steps:
receiving first data comprising the starting location, the destination, and a relative preference of a user of the system for scenic quality of the route compared to at least one other objective, the at least one other objective comprising time of the route, cost of the route, and distance of the route;

quantifying the scenic quality of the route using just values of properties along the segments of potential paths;

aggregating the just values of the properties along the segments of potential paths, on a per-segment basis, to generate a set of aggregated just values data;

normalizing the values in the set of aggregated just values data into a fixed range to generate a normalized set of values data, the normalized set of just values data being used to represent the scenic quality in the relative preference;

utilizing map data to generate segments of potential paths between the starting location and the destination;

running an algorithm on the segments of potential paths, using the relative preference, to generate the route from the starting location to the destination;

providing the route in audio form to the user of the system;

displaying, on the display, the route in both graphic and textual form to the user of the system;

receiving second data from the user of the system comprising whether the displayed route is acceptable; and if the second data indicates the displayed route is unacceptable, allowing the user of the system to update the relative preference, running the algorithm again using the updated relative preference to generate an updated route, and displaying the updated route to the user of the system, the relative preference comprising a weighted selection triangle of the scenic quality of the route and two other objectives, the two other objectives comprising two of the time of the route, the cost of the route, and the distance of the route, the quantifying of the scenic quality of the route comprising using publicly available data on the properties along the segments of potential paths, the first data further comprising at least one choice of the user of the system for types of properties to exclude from or include in an evaluation of the scenic quality of the route, the just values being objective market values published by a county appraiser that governs a county having the properties located therein, the just value of each property being a combined value of land and building on said property the combined value being a price for which said property is appraised by the county appraiser as being able to be sold for in a competitive market as of January 1 of the year for which the just value was appraised by the county appraiser, the running of the algorithm to generate the route further comprising using the at least one choice, and the system further comprising a smart device, the smart device comprising the display and the processor.

* * * * *